United States Patent [19]

Riedel

[11] 4,094,262
[45] June 13, 1978

[54] ICECRAFT

[76] Inventor: Tilo Riedel, Wielandstrasse 6, D-8051 Eching, Germany

[21] Appl. No.: 781,446

[22] Filed: Mar. 25, 1977

[30] Foreign Application Priority Data

Mar. 26, 1976 Germany .............................. 2612984

[51] Int. Cl.² ............................................ B63B 35/00
[52] U.S. Cl. ..................................... 114/43; 280/11.2; 114/39
[58] Field of Search .................. 114/39, 43; 9/310 E; 280/11.2, 11.37 S, 213

[56] References Cited

U.S. PATENT DOCUMENTS

| | | | |
|---|---|---|---|
| 3,349,741 | 10/1967 | Herbst | 114/43 |
| 3,487,800 | 1/1970 | Schweitzer | 114/39 |
| 3,514,798 | 6/1970 | Ellis | 9/310 E |
| 3,558,149 | 1/1971 | Weidenbacker | 280/11.12 |
| 3,831,539 | 8/1974 | Black | 114/43 |
| 3,982,766 | 9/1976 | Budge | 114/39 |

*Primary Examiner*—Trygve M. Blix
*Assistant Examiner*—D. W. Keen
*Attorney, Agent, or Firm*—Michael J. Striker

[57] ABSTRACT

An icecraft has a base provided with a plurality of ice-engaging runners. A sail-surfing rig including an articulated mast carrying a triangular sail held in place by means of a bow-type boom is fitted to this support plate so that a user can stand on the support plate and ice sail in much the same manner as in surf sailing. A standard surfboard can constitute the base plate for such an icecraft, and the runners can be replaced by wheels or the like if desired for summer use of the arrangement on land.

10 Claims, 6 Drawing Figures

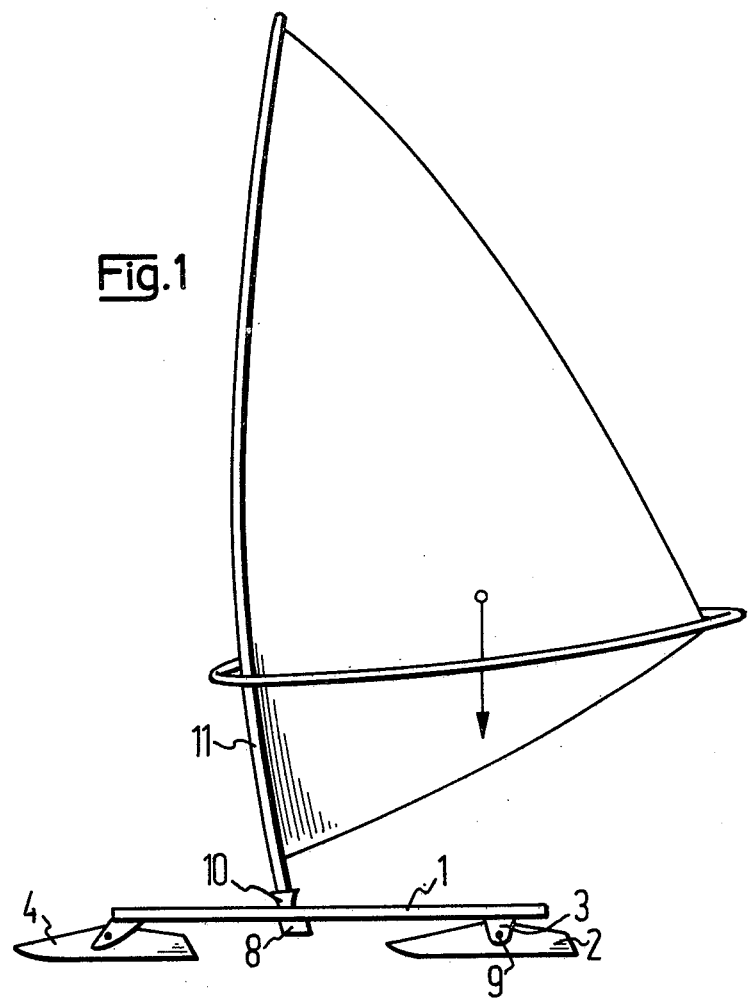
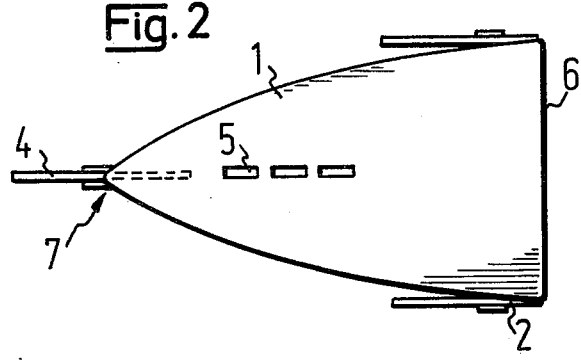
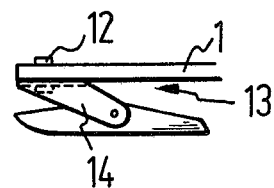

4,094,262

ICECRAFT

BACKGROUND OF THE INVENTION

The present invention refers to a sail-driven icecraft or landcraft. More particularly this invention concerns a convertible iceboat.

An iceboat typically has a base that is supported by means of a plurality of runners all directed parallel to one another. The base is provided normally with a marconi or triangular-sail rig and normally at least one of the runners is pivotal about a vertical axis relative to the other runner for rudder-like steering of the icecraft.

Such an iceboat typically is relatively large and difficult to transport. Furthermore the sporting possibilities with such a craft are relatively limited, due to the poor maneuverability and difficulty of control of most iceboats. Indeed ice sailing is such a relatively simple sport that the only challenge in it appears to be attaining relatively high speeds. Furthermore, such a craft is unusable except during months when a heavy ice cover is present.

SUMMARY OF THE INVENTION

It is therefore an object of the present invention to provide an improved icecraft.

Another object is to provide an icecraft which can be converted for use as a landcraft.

A further object is to provide such an icecraft which offers increased sporting possibilities and which is relatively easy to transport.

These objects are attained according to the present invention in an icecraft having a rigid support board capable of supporting a person and itself supportable by means of a plurality of generally parallel runners which are spaced apart on one of the sides or faces of the support board. An articulated sail-surfing mast projects upwardly from the other of the faces of the support board and carries a sail. The mast is provided adjacent its base with a ball-and-socket joint and has a bow-type boom so that the user can stand on the support board and manipulate the sail in the same manner as in sail surfing. Thus the sail can be moved through 360° about the upright mast, and the mast can be tipped depending on the wind. In this manner, even though the base itself normally stays flat on the ice, the same effect can be achieved as when a sail boat keels in heavy winds. The user normally stands to the weather side of the sail and leans into the wind while holding onto the bow constituting the boom, whereby the center of gravity remains over the support plate and between the runners thereon.

According to yet another feature of this invention the board is generally triangular and has, relative to a normal forward direction of displacement, a pointed front end constituting the apex of an isosceles triangle and provided with a leading runner and has a pair of trailing runners at its rear corners. The mast is secured to the base on a center line thereof toward the front end. A plurality of sockets for the sail or swivel joint may be provided on the support plate.

In accordance with the present invention at least one of the runners is of the non-directional type. Thus rather than a straight runner edge it can have a downwardly convex or arcuate runner edge in order that the icecraft can turn more easily.

In accordance with yet another feature of this invention the base, which in addition to being of the triangular shape described above can be of any other polygonal or round shape desired, is constituted as a standard surfboard provided with a sail-surfing rig as described above. Runners, or even rollers or the like, are releasably secured to this surfboard in order to allow the sail surfer a winter sporting activity similar to sail surfing. It is also noted that the runners of the icecraft according to this invention can similarly be replaced by wheels for non-winter use of the arrangement.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a side view of an icecraft according to this invention;

FIG. 2 is a top view of the support plate of the craft of FIG. 1;

FIGS. 3 and 4 are side views of variations on the arrangement of FIG. 1;

DESCRIPTION OF THE PREFERRED EMBODIMENTS

Figure 4:
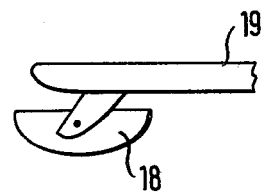

As shown in FIGS. 1 and 2 an icecraft according to this invention basically comprises a generally triangular plate 1 formed of honeycomb-type synthetic-resin material and provided with reinforcement ridges. This plate 1 has a straight back or base edge 6 and a point or tip 7, with a pair of slightly outwardly convex sides 15 interconnecting them. A pair of forwardly directed parallel runners 2 are pivotal about axes 9 on holders 3 at the rear end of the plate 1 and a similar such runner 4 is provided at the tip 7. These runners are, therefore, all parallel to each other and located approximately at respective corners of the plate 1.

Immediately behind the tip 7 there are provided in this arrangement three sockets or holes 5 in which can fit a holder 8 carrying a ball-and-socket swivel 10 secured to the bottom of a slightly curved mast 11. A sail 16 having a bow-type boom 17 is secured to this mast 11 and constitutes a standard sail-surfing rig.

In use the sailor stands on the plate 1 and holds the bow 17 in his or her two hands, rotating the sail 16 with the mast 11 in the swivel 10 according to the trim desired, and tilting the entire mast 11 and sail 16 into or away from the wind. Tipping it away from the wind will cause the sail 16 to spill air and slow the craft down and similarly tipping it into the wind will catch all available air and make the boat move most rapidly. The user can lean completely outwardly holding onto the bow 17 in strong winds, maintaining at all times a center of gravity of the assembly between the triangle defined by the runners 2 and 4.

It is also possible as shown in FIG. 3 to replace the frontmost runner with a runner 13 having a holder 14 pivotal about a vertical axis 12 at the tip 7 of the boat.

Similarly it is possible as shown in FIG. 4 to replace any of the runners 2, 4 or 13 with a runner 18 having an edge 18' of arcuate shape. Thus this runner of FIG. 4 is non-directional.

Figure 5:
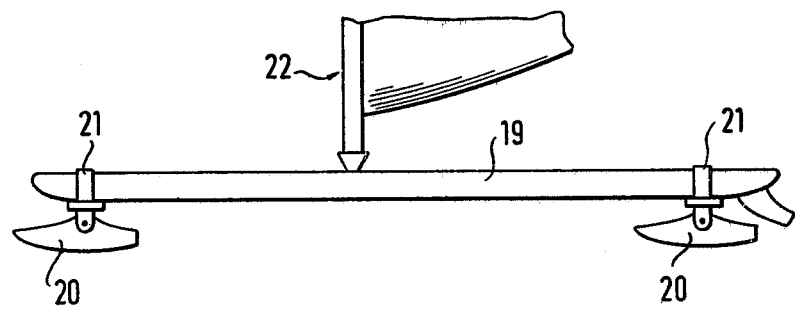
FIG. 5 is a side view of a portion of another icecraft according to this invention.

In FIG. 5 an arrangement is shown wherein a standard surfboard 19 having a pair of sides of generally rounded shape is provided at its front end with one or two runners 20 and at its rear end with one or two runners 20. Overall at least three runners are provided, whether two in the front and two in the back or only one at one of the ends. Furthermore straps 21 releasably secure the runners 20 in place. A standard surf-sailing rig 22 is provided on the arrangement. Thus it is possible for the user to employ his or her surf-sailor during the winter on ice.

Figure 6:
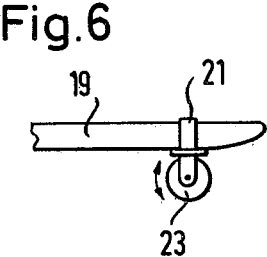
FIG. 6 is a detail view of a variation on the arrangement of FIG. 5.

Finally FIG. 6 shows how the surfboard 19 of FIG. 5 can also be used with rollers 23 held on by means of straps 21. Such an arrangement allows the surf-sailor even to be used in a flat area such as a parking lot during summer months.

It will be understood that each of the elements described above, or two or more together, may also find a useful application in other types of structures differing from the types described above.

While the invention has been illustrated and described as embodied in an icecraft, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An icecraft comprising:
    a rigid support board capable of supporting a person and having an outer periphery and a pair of opposite faces;
    a plurality of runners directed generally parallel to one another and spaced apart on one of said faces in such a manner that said board can stand on said runners, said board being displaceable in a normal direction of travel on ice via said runners and said runners being arranged with two of said runners spaced transversely apart perpendicular to said direction and one of said runners spaced in said direction from said two runners;
    means including a pivot connecting said one runner to said board for pivoting relative to said board about an axis generally perpendicular to said faces and caster-fashion generally ahead of said one runner in said direction;
    an articulated sail-surfing mast projecting from the other of said faces; and
    a sail secured to said mast and constituting therewith a standard sail-surfing rig.

2. The icecraft defined in claim 1, wherein said board is generally triangular and has three corners, each of said runners being mounted in a respective corner.

3. The icecraft defined in claim 2, wherein said board is provided within said periphery with a holder for said mast.

4. The icecraft defined in claim 3, wherein one of said runners has a convex ice-engaging edge turned away from said board.

5. The icecraft defined in claim 4, wherein said holder is relatively close to one of said corners and relatively far from the other corners, said one runner having said edge being at said one corner.

6. The icecraft defined in claim 3, wherein said holder is positioned on a line extending through one of said corners and equidistant between the other two corners.

7. The icecraft defined in claim 6, wherein each of said runners is tippable about a respective axis parallel to said board and to the axes of the other runners.

8. The icecraft defined in claim 1, wherein said board is a standard surfboard, said icecraft further comprising means for releasably securing said runners to said surfboard.

9. An icecraft comprising:
    a generally triangular rigid board capable of supporting a person and having a pair of faces and three corners;
    a runner mounted on one of said faces in each of said corners and extending in a predetermined travel direction, all of said runners being generally parallel;
    a holder on the other of said faces at a location spaced transverse to said direction generally equidistant to two of said runners and in said direction being spaced further from said two runners than from the other runner;
    means including a pivot connecting said other runner to said board for pivoting relative thereto caster-fashion about an axis generally perpendicular to said faces and generally ahead of said other runner in said direction;
    a swivel mounted in said holder;
    a mast secured to said swivel and extending away from said other face;
    a generally triangular sail secured to said mast and extensible therefrom in said direction; and
    a bow boom secured to said mast and to said sail and extensible in said direction from said mast.

10. The icecraft defined in claim 9, wherein said runners are removable, said icecraft further comprising means for securing wheels to said face after removal of said runners.

* * * * *